(12) United States Patent
Bartolome et al.

(10) Patent No.: US 9,684,066 B2
(45) Date of Patent: Jun. 20, 2017

(54) LIGHT RADAR SIGNAL PROCESSING APPARATUS, SYSTEMS AND METHODS

(71) Applicant: TEXAS INSTRUMENTS INCORPORATED, Dallas, TX (US)

(72) Inventors: Eduardo Bartolome, Dallas, TX (US); Fernando Alberto Mujica, Los Altos, CA (US); Sandeep Oswal, Bangalore (IN); Abhaya Kumar, Mahadevapura (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 425 days.

(21) Appl. No.: 14/518,800

(22) Filed: Oct. 20, 2014

(65) Prior Publication Data

US 2015/0116695 A1 Apr. 30, 2015

Related U.S. Application Data

(60) Provisional application No. 61/896,536, filed on Oct. 28, 2013.

(51) Int. Cl.
  *G01C 3/08* (2006.01)
  *G01S 7/486* (2006.01)
  *G01S 17/10* (2006.01)

(52) U.S. Cl.
  CPC .......... *G01S 7/4861* (2013.01); *G01S 7/4865* (2013.01); *G01S 17/10* (2013.01)

(58) Field of Classification Search
  CPC ....... G01S 17/10; G01S 7/4861; G01S 7/4865
  (Continued)

(56) References Cited

U.S. PATENT DOCUMENTS

| 6,788,746 B1 * | 9/2004 | Mack .................. G01J 11/00 375/316 |
| 2008/0175596 A1 * | 7/2008 | Morcom ............... G01S 7/023 398/151 |

(Continued)

OTHER PUBLICATIONS

S. Callier et al.; "Silicon Photomultiplier integrated readout chip (SPIROC) for the ILC: measurements and possible further development"; IEEE Nuclear Science Symposium Conference Record; Jan. 2009; N03-1; Institute of Electrical and Electronic Engineers; USA.

(Continued)

*Primary Examiner* — Mark Hellner
(74) *Attorney, Agent, or Firm* — Tuenlap D. Chan; Charles A. Brill; Frank D. Cimino

(57) ABSTRACT

Samples of a light radar ("LIDAR") return signal are stored in an analog circular buffer following the transmission of a LIDAR pulse. Sampling continues for a fixed period of time or number of samples during a post-trigger sampling period after the occurrence of a trigger signal from a trigger circuit. The trigger circuit indicates the receipt of a return pulse associated with a target object based upon one or more return signal characteristics. Following the post-trigger sampling period, the stored analog samples are sequentially read out and converted to digital sample values. The digital sample values may be analyzed in a digital processor to further confirm the validity of the returned LIDAR pulse, to determine a time of arrival of the LIDAR pulse, and to calculate a distance to the target object. Some versions include multiple circular buffers and capture clocks, enabling the capture of samples from multiple return pulses.

20 Claims, 6 Drawing Sheets

(58) Field of Classification Search
USPC .......................................................... 356/5.05
See application file for complete search history.

(56) References Cited

U.S. PATENT DOCUMENTS

| | | | |
|---|---|---|---|
| 2009/0079956 A1* | 3/2009 | Kennedy ............... | G01S 7/4816 |
| | | | 356/4.01 |
| 2011/0141453 A1 | 6/2011 | Clement et al. | |
| 2013/0250273 A1* | 9/2013 | Ludwig .................. | G01S 17/10 |
| | | | 356/4.07 |

OTHER PUBLICATIONS

Markus-Christian Amann et al.; "Laser ranging: a critical review of usual techniques for distance measurement"; Optical Engineering; Jan. 2001; pp. 10-19; vol. 40(1); Society of Photo-Optical Instrumentation Engineers; USA.

Jutzi, B. et al.; "Measuring and processing the waveform of laser pulses"; Proceedings of the 7th Conference on Optical 3-D measurement Techniques; Nov. 2005; pp. 194-203; vol. 1; Fraunhofer FOM (now IOSB); ISBN: 3-9501492-2-8; Austria.

* cited by examiner

LIGHT RADAR SIGNAL PROCESSING APPARATUS, SYSTEMS AND METHODS

PRIORITY CLAIM

This application claims the benefit of priority under 35 U.S.C. §119(e) to U.S. Provisional Patent Application Ser. No. 61/896,536 titled "ANALOG MEMORY BASED LIDAR SYSTEM" filed on Oct. 28, 2013 and incorporated herein by reference in its entirety.

TECHNICAL FIELD

Embodiments described herein relate to apparatus and methods associated with light pulse based distance measuring, including return signal capture and processing.

BACKGROUND INFORMATION

Length or distance measurement techniques, once limited to mechanical devices such as tapes and sticks of known length to stretch across or otherwise traverse a distance to be measured, have evolved. Newer techniques include the transmission of a pulse of energy ("transmitted pulse") at a time of transmission ("TOT") to a target at the far end of the distance to be measured. A return pulse of energy ("return pulse") reflected from the target is received at the point of transmission at a time of arrival ("TOA"). A time difference between the TOA and the TOT is calculated. The round trip distance between the point of transmission and the target is then calculated as the time difference multiplied by the speed of transmission of the pulse of energy through a medium such as air. A sonic pulse is transmitted at the speed of sound through the medium across the distance, for example, and a light pulse by the speed of light through the medium. The latter case is often referred to as LIght RaDAR or "LIDAR," and is referred to by that acronym herein.

FIG. 1A is a block diagram of a prior-art LIDAR return signal processing apparatus 100. The apparatus 100 is enabled following transmission of the transmitted pulse and detects electromagnetic energy at wavelengths including those associated with the transmitted pulse at a photo-detector 105. The photo-detector 105 converts the light energy into an electrical signal that is amplified and otherwise analog processed in an amplifier 107. The processed signal appears at an output 110 of the amplifier 107 and is referred to hereinafter as the "return signal."

FIG. 1B is a prior-art waveform diagram of an example LIDAR return signal 113. The timeline 114 associated with the waveform diagram includes a partial time segment 115 during which the outgoing pulse (not shown) is transmitted at t=0. Referring back and forth between FIG. 1A and FIG. 1B, a comparator 118 compares the magnitude of the return signal 113 to a threshold reference voltage 125. The threshold reference voltage 125 is generated by a threshold reference voltage source 120 and is preset to distinguish noise from a return pulse 135 corresponding to a target object at the distance to be measured.

An output 140 of the comparator 118 is triggered when the magnitude of the return signal 113 exceeds the threshold reference voltage 125. A clock in a time measurement unit (TMU) 145 is started at outgoing pulse TOT, t=0. The clock is stopped at the TOA 150 of the return pulse 135 corresponding to the positive-going threshold crossing event. A processing circuit 155 converts the TOA 150 to a distance-to-target 160 from the round trip distance 165 based upon the speed of light through the traversed medium as described above.

FIG. 2 is a block diagram of a prior-art LIDAR return signal processing apparatus 200. The LIDAR apparatus 200 includes a photo-detector 105 and an amplifier 107 to generate the return signal 113 as described above with reference to the apparatus 200. However, the apparatus 200 also includes a fast analog-to-digital converter ("ADC") 205. The ADC 205 continuously generates digital samples of the return signal 113 and presents the samples to a processing apparatus 210. A processing apparatus 210 performs various signal analysis operations on the digital samples. The signal analysis operations enable the LIDAR apparatus 200 to better distinguish the portion 135 of the return signal 113 corresponding to the target object from other portions of the return signal 113 and to obtain and deliver from the portion 135 the distance-to-target 160 at one or more output terminals.

Generally speaking, LIDAR return signal processing apparatus such as the apparatus 100 utilize lower-cost components and consume relatively less power than full return signal digitizing and processing LIDAR apparatus such as the apparatus 200. However, the processor 210 of the apparatus 200 has access to samples from the complete LIDAR return signal and can statistically process the samples using digital signal processing ("DSP") techniques.

SUMMARY OF THE INVENTION

Structures and methods disclosed herein receive a LIDAR return signal and discriminate based upon magnitude or other criteria to recognize one or more portions of the return signal associated with a target object. Samples of the return signal are captured and stored in an analog circular buffer to be digitized when the return pulse is detected. The disclosed structures and methods thus provide digital sample values suitable for further analysis while conserving ADC, processor, and power resources by limiting digitization to portions of the LIDAR return signal determined to be associated with the target object.

Figure 1A:
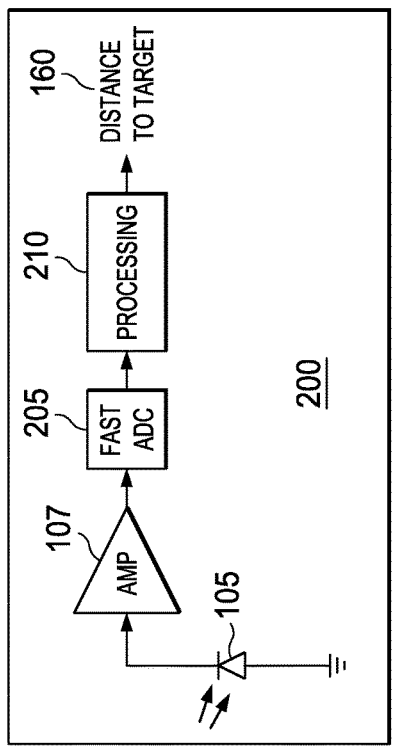
FIG. 1A is a block diagram of a prior-art LIDAR return signal processing apparatus.
Figure 2:
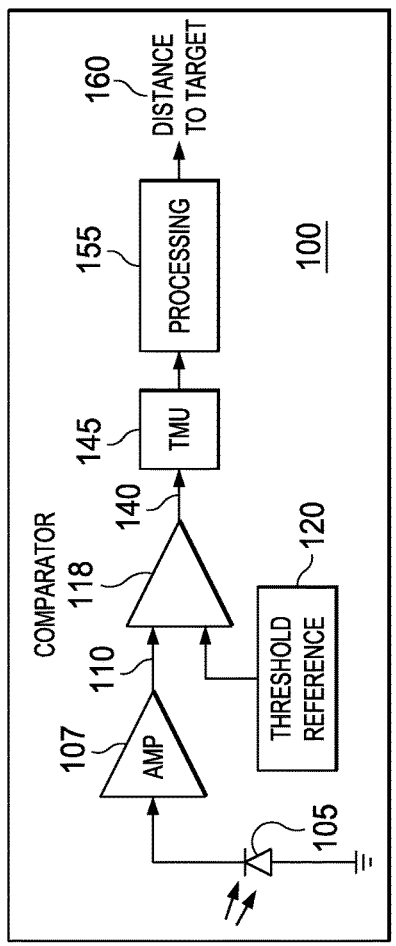
FIG. 2 is a block diagram of a prior-art LIDAR return signal processing apparatus.
Figure 1B:
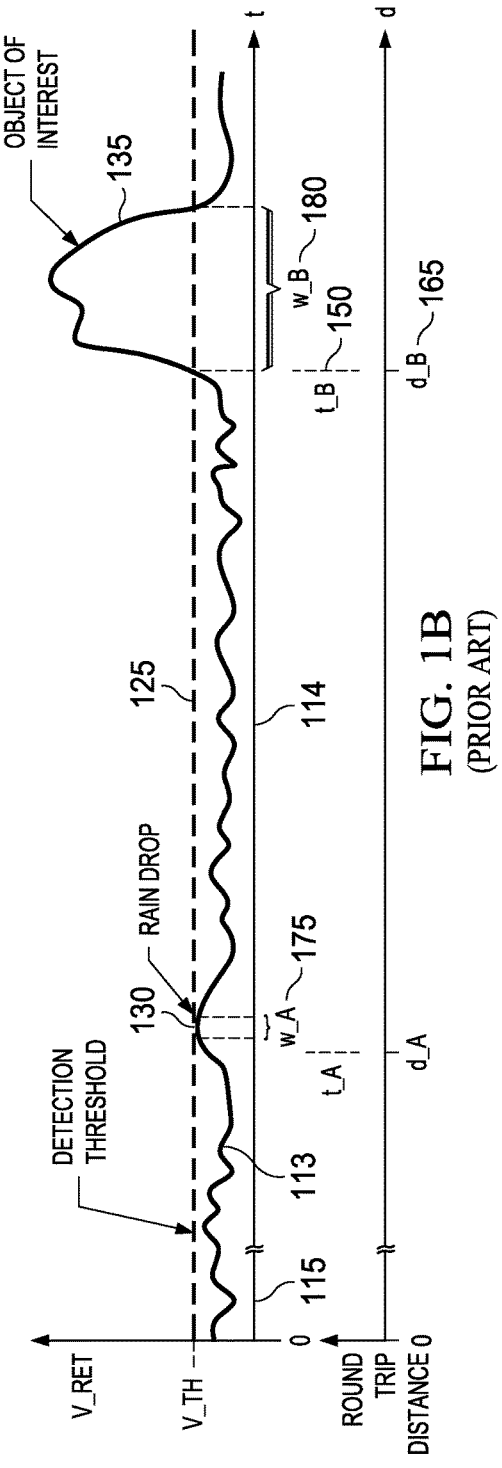
FIG. 1B is a prior-art waveform diagram of an example LIDAR return signal.

The dual approach of return pulse detection in the analog domain and digitization for further analysis may overcome two disadvantages of prior-art level detection only methods as understood by the inventors of the disclosed subject matter. Reducing the threshold voltage level 125 of FIG. 1 enables the detection of weaker returns from far away objects, highly light absorbing objects or highly specular objects that may reflect the light in a direction different from the location of the LIDAR receiver. However, reducing the threshold level 125 may also increase the rate of false triggers due to noise in the signal and/or noise on the threshold voltage 125 itself. Also, the slope of the leading edge of the return pulse is finite and may vary (e.g., due to a slanted reflective surface). Consequently, the intercept point of the leading edge with the threshold level 125 can vary in time for several objects at the same distance, even in the absence of noise.

In order to achieve higher detection efficiency and higher accuracy, structures herein described generate samples from key portions of the LIDAR return signal rather than basing TOA on a single intersection point. Digital signal processing ("DSP") techniques are then applied to the samples to extract a more accurate estimate of the TOA and thus more accurately determines the distance to the target object. Such dual approach avoids the penalty of continuously digitizing the entire LIDAR return signal at very fast rates. Consequently, apparatus and systems herein may be implemented with lower-cost, lower-power ADCs and DSP components.

Apparatus, systems and methods herein store samples of a LIDAR return signal in an analog circular buffer after transmission of a LIDAR pulse to a target object. Storage locations associated with a circular buffer are overwritten on a first in, first out basis after the buffer is first filled. Sampling continues for a fixed period of time or number of samples after the occurrence of a trigger signal ("post-trigger sampling period"). The trigger signal is generated when the LIDAR return signal crosses over a predetermined magnitude threshold, indicating a potential LIDAR return pulse associated with a target object. Some versions and sequences disclosed herein may generate the trigger signal based upon other criteria indicating receipt of a return pulse from the target object. A modestly-sized circular buffer thus captures samples of the return pulse in the analog domain, including pre-trigger samples and post-trigger samples. Buffer space is conserved by storing only a portion of the LIDAR return signal associated with the return pulse from the target object.

Following the post-signal sampling period, the disclosed apparatus, systems, and methods sequentially read out the stored samples from the circular buffer into an ADC for conversion to digital sample values. The digital sample values may be analyzed in a digital processor to further confirm the validity of a LIDAR return pulse. The latter method may result in more accurate identification of LIDAR return pulses than a comparator-only method which relies on a single point of the LIDAR return signal for identification. Also, the digital processor may analyze the digital sample values using methods such as "center of gravity" to determine a return pulse TOA. The use of several samples may increase the accuracy of the TOA calculation relative to prior-art comparator-only methods even under conditions of return signal noise or pulse variations. It is noted that the accuracy of the TOA as determined using methods and structures herein described is independent of the trigger accuracy for a given return pulse. The digital processor also calculates the target distance from the return pulse TOA.

Some versions of the disclosed structures and methods present the digital samples from the ADC at one or more output terminals. Some versions may include a digital processor and/or activities performed by a digital processor. Some versions may also present the return pulse TOA and/or time stamps of sampling times related to the return pulse at one or more output terminals. Some versions may include multiple circular buffers. The latter case permits the capture of samples in one circular buffer while another circular buffer is being read out, enabling the capture of multiple return pulses. Some versions include analog processing circuitry positioned in series between the circular buffer and the ADC to pre-process the read-out analog samples. Such pre-processing may be similar to that done by a digital processor, with the advantage of reducing the number of analog values prior to digital conversion. Reducing the number of analog values may reduce the number of A/D conversions and the length of the read-out period ("dead time") during which return signal capture is suspended. Consequently, slower, less expensive A/D converters and/or a fewer number of circular buffers may be used. Analog processing may, in some versions, reduce the number of analog samples to a single analog value proportional to the TOA.

DETAILED DESCRIPTION

Figure 3:
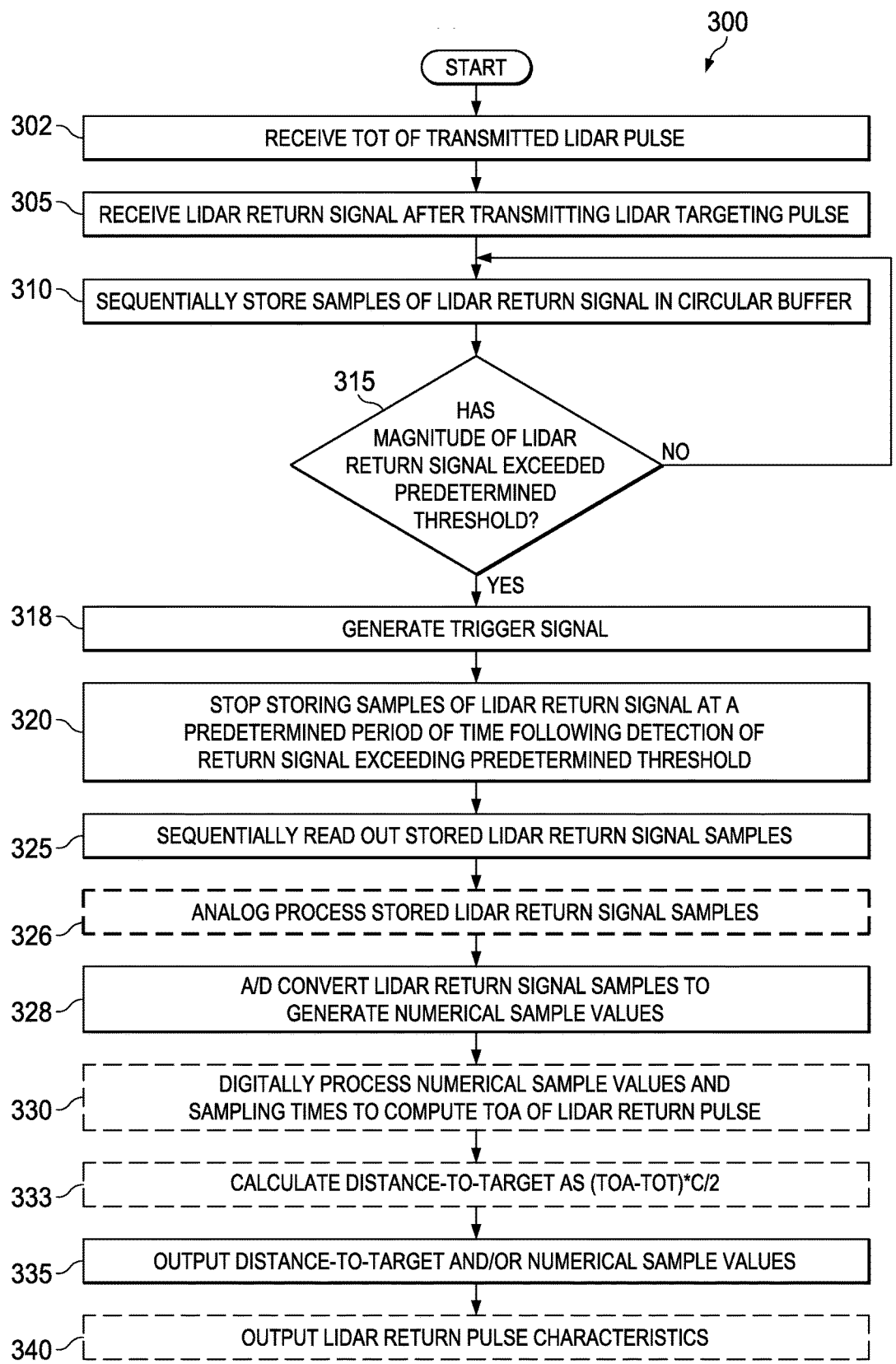
FIG. 3 is a flow diagram of a method of sampling and processing a LIDAR return signal according to various example sequences.

FIG. 3 is a flow diagram of a method 300 of sampling and processing a LIDAR return signal according to various example sequences. The method 300 commences at block 302 with receiving a TOT of a LIDAR pulse transmitted through a medium. The method 300 proceeds at block 305 with receiving the LIDAR return signal following the transmission of the LIDAR pulse.

The method 300 includes storing samples of the LIDAR return signal in a set of N analog storage elements organized as a circular buffer, at block 310. "Circular buffer" as used herein means a set of N storage elements capable of being sequentially written to and overwritten when full on a first-in, first-overwritten basis. When the circular buffer becomes full, the oldest, first-stored data is subsequently sequentially overwritten as additional samples of the LIDAR return signal are clocked into the circular buffer while the LIDAR return signal is being received. Each stored sample is an analog representation of a magnitude of the LIDAR return signal at a corresponding sample time.

The method 300 continues at block 315 with determining whether a magnitude of the LIDAR return signal has exceeded a predetermined threshold. If not, samples of the LIDAR return signal continue to be stored in the circular buffer, at block 310. If and when the magnitude of the LIDAR signal exceeds the predetermined threshold, a trigger signal is generated at a trigger time, at block 318. The method 300 includes continuing to store LIDAR return signal samples in the circular buffer for a predetermined period of time following the generation of the trigger signal (the "post-trigger period"). The method 300 also includes terminating the storage of LIDAR return signal samples following the post-trigger period, at block 320.

Following the post-trigger period, the method 300 includes sequentially reading out the stored LIDAR return signal samples, at block 325. Some version of the method 300 may also include analog processing the read-out LIDAR return signal samples, at block 326. Such analog processing may result in a decreased number of analog samples. Analog processing computes the TOA from the analog samples using techniques such as "center of gravity" implemented in analog circuitry. The method 300 also includes A/D converting the LIDAR return signal samples to generate a set of digital sample values representing the LIDAR return signal magnitude samples, at block 328. In the case of analog processing activities at block 326, the method 300 includes A/D converting the analog processed set of analog samples to generate a set of analog processed digital sample values, at block 328.

Some versions of the method 300 may also include digitally processing the set of digital sample values and sampling times associated with the analog samples of the LIDAR return signal, at block 330. Such digital processing operations obtain the TOA of a return pulse portion of the LIDAR return signal representing a reflection from a target object.

The method 300 may also include calculating a distance-to-target, at block 333. The distance-to-target is calculated as a difference between the TOA and the TOT multiplied by a speed of light through the medium divided by two:

$$\text{Distance-to-target}=(TOA-TOT)*c/2$$

The method 300 may also include presenting the distance-to-target and/or the set of digital sample values at one or more output terminals, at block 335. The method 300 may conclude with presenting one or more return pulse characteristics extracted from the LIDAR return signal samples at one or more output terminals, at block 340. Pulse characteristics to be output may include pulse TOA, pulse height, pulse width, type of object from which the return pulse was reflected, etc.

Figure 4:
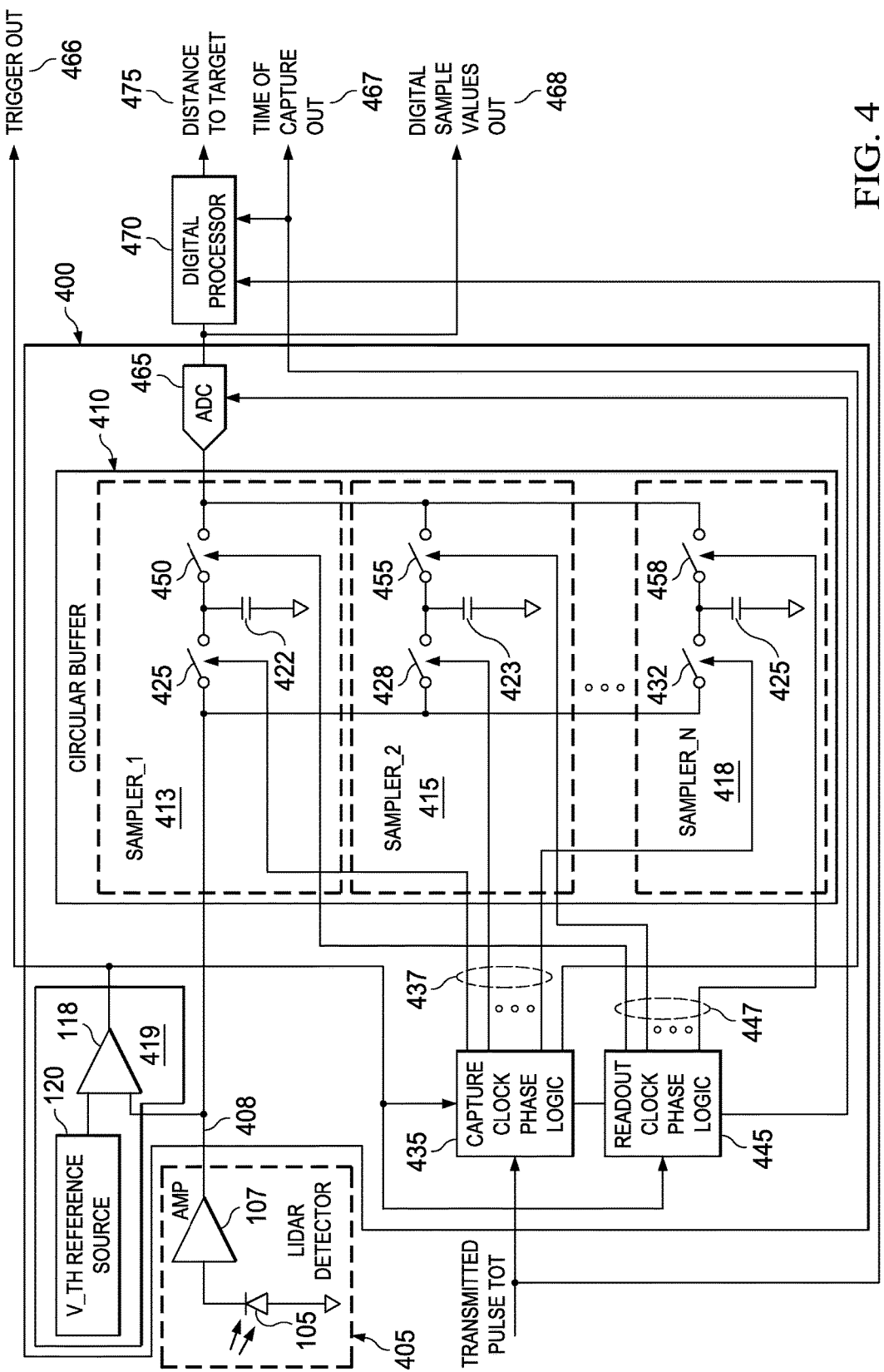
FIG. 4 is a schematic diagram of a LIDAR return signal processing apparatus according to various example embodiments.

FIG. 4 is a schematic diagram of a LIDAR return signal processing apparatus 400 according to various example embodiments. The apparatus 400 receives a LIDAR return signal from a LIDAR return signal detector 405 at an input 408 of the apparatus 400. The LIDAR return signal detector 405 includes a photo detector 105 and low-noise amplifier ("LNA") circuitry 107. The photo detector 105 may be a photo diode as shown, a photo transistor, an avalanche photodiode, a silicon photomultiplier or any other type of detector capable of detecting photons of a return signal in the wavelength range of a transmitted LIDAR signal. The LNA circuitry 107 may be implemented with a trans-impedance amplifier, charge-sensitive amplifier, voltage amplifier or other circuitry suitable for amplifying the LIDAR return signal.

The apparatus 400 includes a circular buffer 410 coupled to the input 408. The circular buffer 410 includes a predetermined number of analog sampling stages (e.g., the example sampling stages 413, 415, and 418) coupled to the input 408. Each analog sampling stage illustrated and described herein is a sample-and-hold circuit as is known in the art. It is noted that the apparatus 400 and other apparatus and systems described herein may employ sample-and-hold circuits with alternate architectures that perform the functions described. An input of each sampling stage receives the LIDAR return signal and stores a magnitude sample of the LIDAR return signal at a sampling time associated with the sampling stage. Sampling times are determined as further described below.

Each sampling stage of the circular buffer 410 includes an analog storage element (e.g., the capacitors 422, 423 and 425 associated with the sampling stages 413, 415 and 418, respectively). Each analog storage element stores a magnitude sample of the LIDAR return signal at the sampling time associated with the sampling stage. The example analog storage elements are shown as capacitors on FIG. 4. Each capacitor stores a LIDAR return signal sample magnitude as a voltage level. It is noted, however, that some versions of the circular buffer 410 may utilize other analog storage elements.

Each sampling stage of the circular buffer 410 also includes a sampling switch (e.g., the sampling switches 425, 428 and 432). Each sampling switch is coupled to a respective analog storage element and to the LIDAR return signal detector 405 to receive the LIDAR return signal. Each sampling switch initiates storage of the LIDAR return signal magnitude sample at the sampling time associated with the respective sampling stage when closed and terminates the sampling time when opened.

Each sampling stage of the circular buffer 410 also includes a readout switch (e.g., the readout switches 450, 455 and 458). Each readout switch is coupled to the analog storage element to present the stored LIDAR return signal magnitude sample at an output of the circular buffer at a readout time associated with the sampling stage when closed.

The LIDAR return signal processing apparatus 400 also includes a trigger circuit 419 coupled to the LIDAR return signal detector 405. The trigger circuit 419 generates a trigger signal upon sensing a return signal characteristic indicating a potential LIDAR return pulse associated with a target object. In some versions of the apparatus 400, the trigger circuit 419 may include a voltage comparator 118 and a threshold reference voltage source 120. A first input of the voltage comparator 118 is coupled to the threshold reference voltage source 120 to establish a predetermined threshold voltage V_TH. A second input of the voltage comparator 118 is coupled to the LIDAR return signal detector 405. The voltage comparator 118 triggers when the magnitude of the LIDAR return signal is equal to or greater than V_TH, indicating a potential LIDAR return pulse from a targeted object.

Some versions of the trigger circuit 419 may include a comparator monitor (not shown) coupled to the voltage comparator 118. The comparator monitor senses the output of the voltage comparator 118 at periodic intervals for a number of times corresponding to the number N of sampling stages associated with the circular buffer 410. The trigger 466 is generated if and when a combination of the voltage comparator outputs is positive, indicating that the return signal has remained above V_TH or returned to a level above V_TH for or during a predetermined period of time. The output of the comparator 118 may be checked at the same time that a new sample is stored in a sampling stage, for example.

Some versions of the trigger circuit 419 may include a circular buffer scanner (not shown) coupled to the circular buffer 410. The circular buffer scanner reads and analyzes the N analog values stored in the circular buffer 410 and, based on the result, generates the trigger 466. In some versions, for example, the scanner may sum the N samples last-stored in the circular buffer and compare the result against a reference voltage. The circular buffer scanner generates the trigger 466 if and when the sum is equal to or greater than the reference voltage. The comparator monitor and the circular buffer scanner are examples of embodiments of techniques that may be used by the apparatus 400 to detect and trigger based upon return pulses whose amplitudes are close to the noise level while keeping false positives low.

Figure 5:
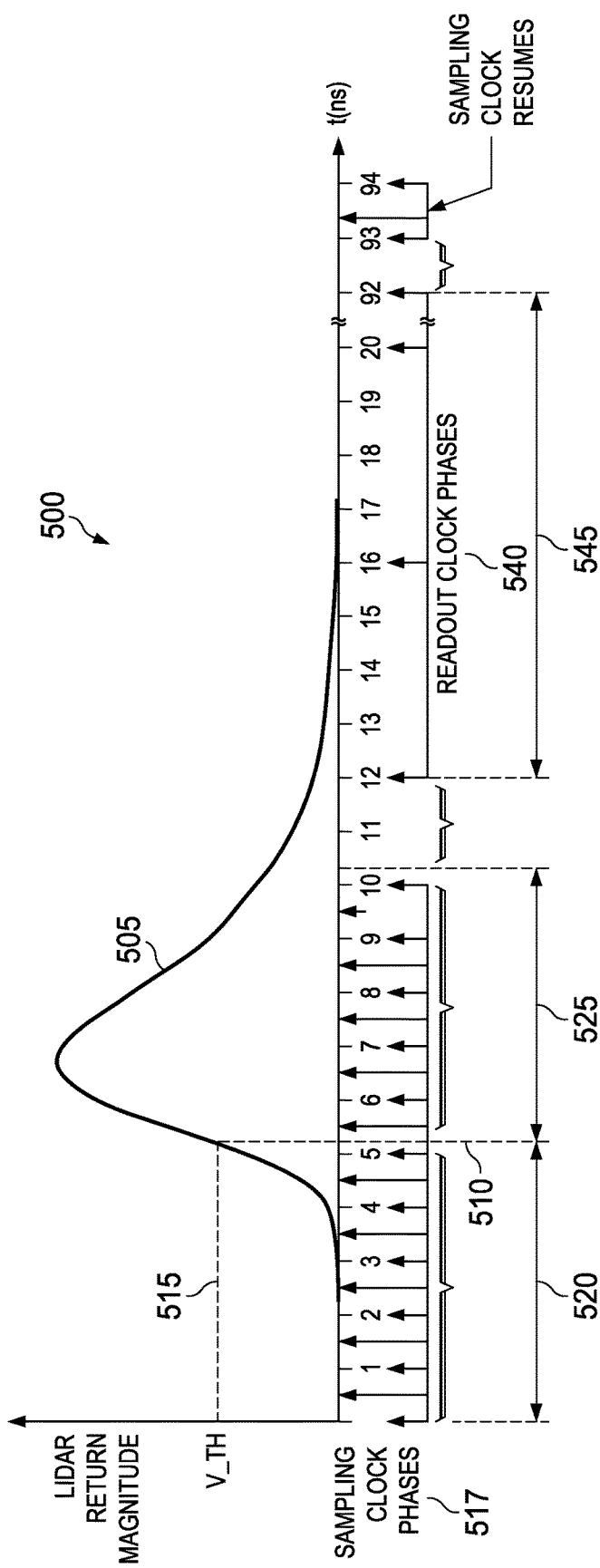
FIG. 5 is a waveform diagram of a LIDAR return pulse illustrating capture and readout clock timing according to various example embodiments and sequences.

FIG. 5 is a waveform diagram 500 of a LIDAR return pulse 505 illustrating capture and readout clock timing according to various example embodiments and sequences. The waveform diagram 500 shows the rising edge of the LIDAR return pulse 505 at a time 510 when the rising edge crosses V_TH 515. The waveform diagram 500 will be referred back to in subsequent discussions.

Referring now to FIGS. 4 and 5 together, the LIDAR return signal processing apparatus 400 also includes a capture clock phase logic module 435 coupled to an output of the trigger circuit 419. The capture clock phase logic module 435 generates phases of a capture control clock (e.g., clock phases appearing at the outputs 437 of the capture clock phase logic module 435). Each phase of the capture control clock controls the sampling time associated with a sampling stage of the circular buffer 410.

An example set of capture control clock phases 517 are shown as arrows occurring at 500 picosecond intervals along the timeline of the waveform diagram 500. The capture control clock phases 517 may occur with periodicities dependent upon a particular implementation of the apparatus 400; 500 picoseconds is merely an example. The capture control clock phases 517 sequentially enable each sampling stage during a pre-trigger period of time 520 when the trigger signal associated with the circular buffer 410 is inactive and for a predetermined post-trigger period of time 525 after the trigger signal becomes active. The pre-trigger and post-trigger periods are determined by the available number of sampling stages implemented to create the circular buffer, the shape of the LIDAR return pulse 505, and the magnitude of V_TH or other trigger criteria based upon wave shape characteristics of the LIDAR return pulse 505. The size of the circular buffer 410 and the magnitude of V_TH may be chosen such that samples of desired portions of LIDAR return pulses of most shapes are captured in the circular buffer 410 by the end of the post-trigger period 525. Some versions of the capture clock phase logic module 435 may also include a time stamp generator (not shown) to generate a time of capture associated with one or more of the capture control clock phases 517. Time of capture in this context is defined as the time at the end of a period between the TOT and a given clock phase of a given loop of the circular buffer. For example, if a circular buffer has twenty sampling stages, is clocked at one gigahertz and the time of the TOT is zero seconds, the time of capture of a sample into the tenth sampling stage during a second loop through the circular buffer after the TOT is t=30 nanoseconds.

The LIDAR return signal processing apparatus 400 also includes a readout clock phase logic module 445 coupled to the output of the trigger circuit 419. The readout clock phase logic module 445 generates phases 540 of a readout control clock (e.g., clock phases appearing at the outputs 447 of the readout clock phase logic module 445). Each readout clock phase controls the readout of a LIDAR magnitude sample stored at a sampling stage of the circular buffer 410. The readout clock phase logic module 445 sequentially enables the readout of the LIDAR magnitude sample stored at each sampling stage. Each sampling stage is read out at a readout time corresponding to the sampling stage during a readout period 545 following the post-trigger period 525. A sampling stage is read out each four nanoseconds in the example of the readout clock phases 540 of FIG. 5. A four nanosecond readout speed is shown merely as an example to illustrate that readout of captured LIDAR magnitude samples may occur at a much slower rate than the capture rate.

In some versions of the apparatus 400, the capture clock phase logic module 435, the readout clock phase logic module 445, or both may be implemented using a delay-locked loop ("DLL"). In such case, each capture clock phase and/or readout clock phase is generated at an output of a delay line element of the DLL.

The LIDAR return signal processing apparatus 400 also includes an ADC 465 coupled to the readout switch associated with each sampling stage of the circular buffer. The ADC 465 is synchronized with the readout control clock to digitize the LIDAR magnitude samples as they are sequentially read out to create a set of digital sample values. Some versions of the LIDAR return signal processing apparatus 400 may present the trigger signal 466, the time of capture of one or more LIDAR analog magnitude samples 467, and/or the set of digital sample values 468 at one or more output terminals for further digital processing external to the apparatus 400. Digital processing may include techniques for determining TOA from the set of digital samples 468 including "center of gravity" techniques.

The readout and ADC conversion rate may be slower than the sampling rate (e.g., 250 MHz vs. 2 GHz for the examples shown) as previously mentioned. The triggered circular buffer architecture of the apparatus 400 thus enables the capture of N samples of a return pulse from a LIDAR return signal in the absence of a resource-intensive ADC and associated digital processing necessary to continually convert and process the entire LIDAR return signal at the sample rate.

Some versions of the LIDAR return signal processing apparatus 400 may include a digital processor 470 coupled to the ADC 465. The digital processor 470 receives the set of digital sample values and a TOT of an outgoing LIDAR pulse transmitted through a medium to the target object prior to sampling the LIDAR return signal. The digital processor 470 analyzes the set of digital sample values 468 to further differentiate the LIDAR return pulse as identified by the trigger from other portions of the LIDAR return signal. The digital processor 470 also calculates the TOA of the LIDAR return pulse by processing the set of digital sample values 468. The digital processor 470 calculates a distance to the target object as a difference between the TOA and the TOT multiplied by the speed of light through the medium divided by two. In the case of having the digital processor embedded in the LIDAR return signal processing apparatus 400, the apparatus 400 may present the distance to the target object 475 at an output terminal.

Figure 6:
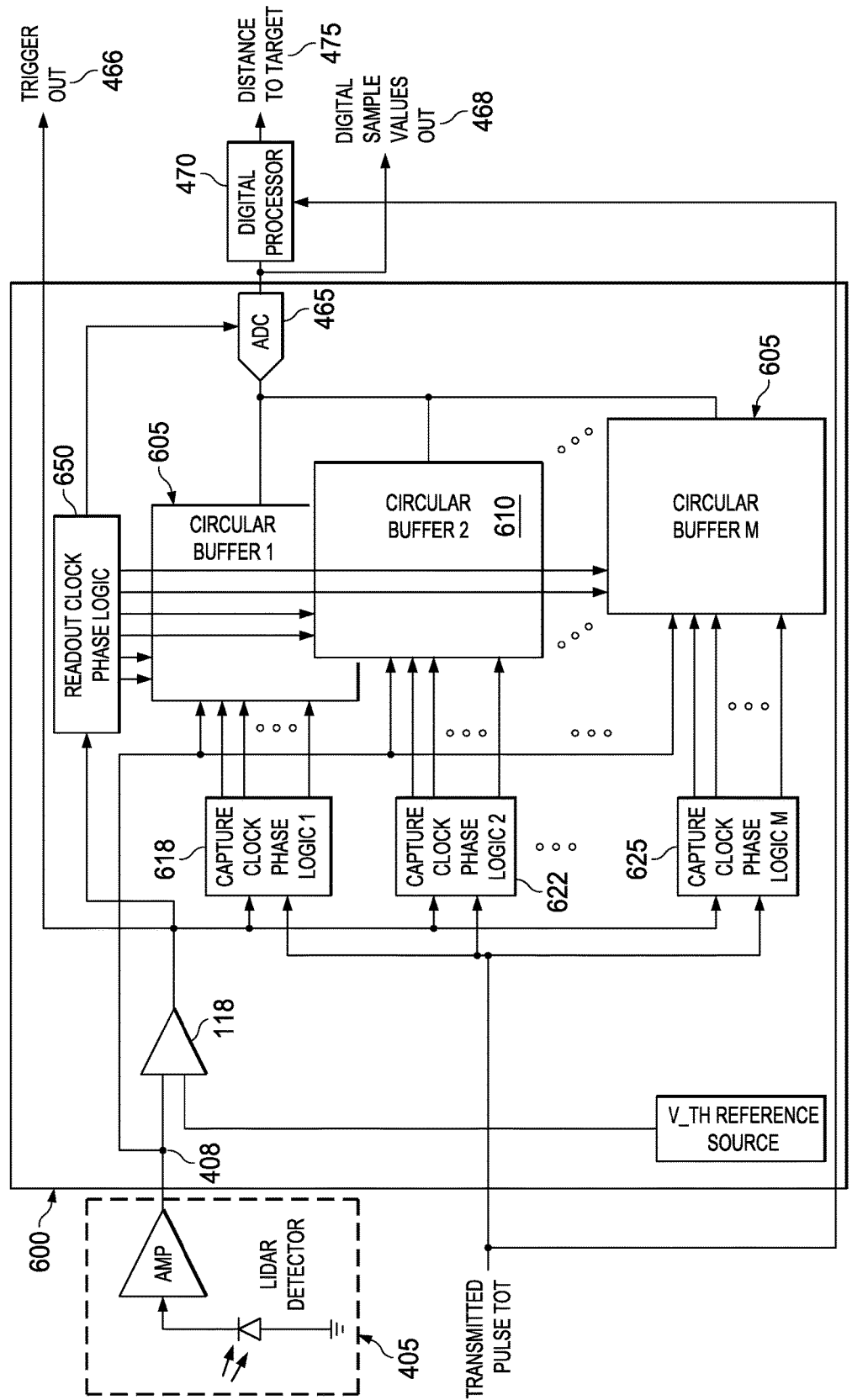
FIG. 6 is a block diagram of a multi-pulse LIDAR return signal processing apparatus according to various example embodiments.

FIG. 6 is a block diagram of a multi-pulse LIDAR return signal processing apparatus 600 according to various example embodiments. The apparatus 600 is organized architecturally and operates in ways similar to the LIDAR return signal processing apparatus 400 of FIG. 4 as previously discussed. However, the apparatus 600 includes a number M of circular buffers (e.g., the circular buffers 605, 610, and 615). Each circular buffer is coupled to a corresponding capture clock phase logic module (e.g., the capture clock phase logic modules 618, 622, and 625, respectively. Each capture clock phase logic module is coupled to a trigger circuit such as a voltage comparator 118. It is noted that the trigger circuits of the apparatus 600 may be of types other than the voltage comparator type trigger as previously discussed in the context of the apparatus 400.

A data input terminal of each of the M circular buffers is coupled to the LIDAR detector 405 at an input terminal 408 and captures analog magnitude samples of the LIDAR return signal during a pre-trigger period and a post-trigger period associated with a given circular buffer. In some embodiments, the capture clock phase logic modules intercommunicate in order to avoid simultaneously triggering the post-sampling period associated with multiple circular buffers. In some embodiments, capture phase logic modules other than the first in the series (e.g. the modules 622 . . . 625) initiate capture by the associated circular buffer only after the immediately previous capture phase logic module has been triggered. The apparatus 600 is thus capable of capturing analog samples of multiple return pulses from the LIDAR return signal.

A readout clock phase logic module 650 generates readout clock phases for a given circular buffer during a readout period following a post-trigger capture period associated with the circular buffer. Some embodiments may include multiple, lower-speed ADCs 465, each coupled to a subset number of the circular buffers. The multi-buffer, multi-capture clock and multi-trigger architecture of the apparatus 600 enables the capture of samples of at least M return pulses from a single LIDAR return signal in the absence of a resource-intensive ADC and the associated digital processing necessary to continually convert and process the entire LIDAR return signal at the sample rate.

Some versions of the LIDAR return signal processing apparatus 600 may present the trigger signal 466, the time of capture of one or more LIDAR analog magnitude samples, and/or the set of digital sample values 468 at one or more output terminals.

Figure 7:
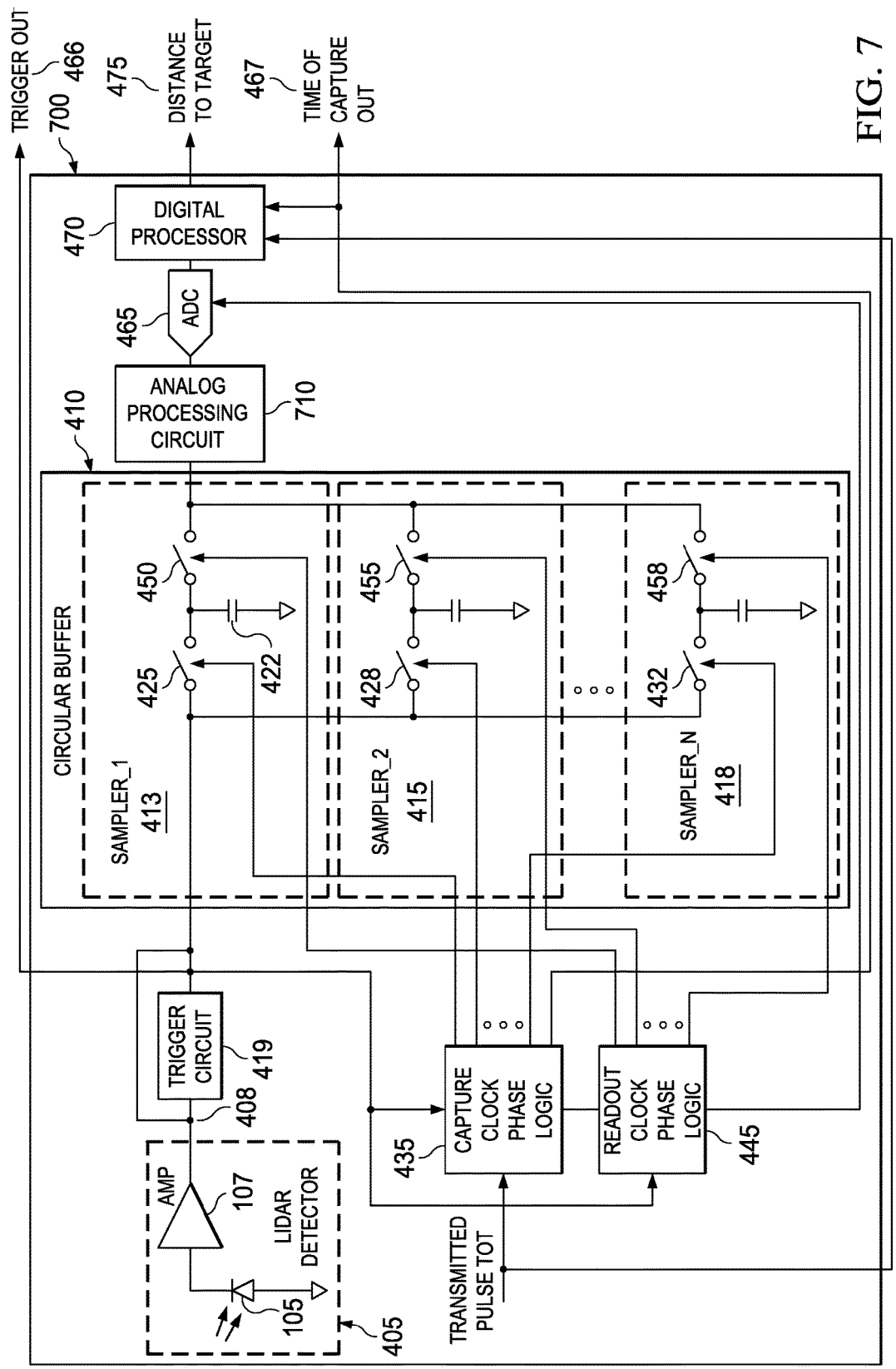
FIG. 7 is a schematic diagram of a LIDAR return signal processing system according to various example embodiments.

FIG. 7 is a schematic diagram of a LIDAR return signal processing system 700 according to various example embodiments. The LIDAR system 700 may include a LIDAR return signal detector 405, one or more circular buffers 410, a trigger circuit 419, one or more capture clock phase logic modules 435, a readout clock phase logic module 445, and an ADC 465, all as coupled together and described in detail above with reference to FIGS. 4, 5, and 6.

The LIDAR return signal processing system 700 may also include an analog processing circuit 710 coupled between the output terminal(s) of the circular buffer(s) 410 and an input terminal of the ADC 465. The analog processing circuit 710 performs calculations such as "center of gravity" calculations on the read out analog samples to determine the TOA. Doing so may enable the analog processing circuit 710 to reduce the number of analog samples to be digitized. Analog processing may, in some versions, reduce the number of analog samples to a single analog value proportional to the TOA. Reduction of the number of conversions associated with the read-out process also reduces the duration of "dead time" during which the buffer cannot capture additional the input signal. Doing so may reduce the complexity of the apparatus by reducing the speed requirement for the A/D converter 465 and/or the number of parallel circular buffers used to capture potential lost events.

The LIDAR return signal processing system 700 may also include a digital processor 470 coupled to the ADC 465. The digital processor 470 receives the set of digital sample values and a TOT of an outgoing LIDAR pulse transmitted through a medium to the target object prior to sampling the LIDAR return signal. The digital processor 470 analyzes the set of digital sample values 468 to further differentiate the LIDAR return pulse as identified by the trigger from other portions of the LIDAR return signal. The digital processor 470 also calculates the TOA of the LIDAR return pulse by processing the set of digital sample values 468. The digital processor 470 calculates a distance to the target object as a difference between the TOA and the TOT multiplied by the speed of light through the medium divided by two.

The LIDAR return signal processing system 700 may present the trigger signal 466, the time of capture 467 of one or more LIDAR analog magnitude samples, the set of digital sample values 468 and/or the distance to the target object 475 at one or more output terminals.

Apparatus, systems and methods described herein may be useful in applications other than capturing, storing, and processing portions of a LIDAR return signal. The examples of the method 300, the apparatus 400 and 600, and the system 700 described herein are intended to provide a general understanding of the structures of various embodiments and the sequences of various methods. They are not intended to serve as complete descriptions of all elements and features of systems and methods that might make use of these example structures and sequences.

Structures and methods disclosed herein receive a LIDAR return signal and discriminate based upon magnitude or other criteria to recognize one or more portions of the return signal associated with a target object. Samples of the return signal associated with the target object are captured and stored in an analog circular buffer and subsequently digitized. The disclosed structures and methods thus provide digital sample values of one or more LIDAR return pulses suitable for further analysis while conserving ADC, processor, and power resources by digitizing only portions of the LIDAR return signal determined to be associated with the target object.

By way of illustration and not of limitation, the accompanying figures show specific embodiments in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing on its own as a separate embodiment.

What is claimed is:

1. A method, comprising:
continually storing samples of a light radar ("LIDAR") return signal in a set of N analog storage elements organized as a circular buffer while the LIDAR return signal is being received;
determining whether a magnitude of the LIDAR return signal has exceeded a predetermined threshold;
generating a trigger signal at a trigger time when the LIDAR return signal exceeds the predetermined threshold;
terminating the storage of LIDAR return signal samples at a post-trigger time following a post-trigger period;
sequentially reading out the stored LIDAR return signal samples; and
analog-to-digitally ("A/D") converting the LIDAR return signal samples to generate a set of digital sample values representing the LIDAR return signal samples.

2. The method of claim 1, each sample an analog representation of a magnitude of the LIDAR return signal at a corresponding sample time.

3. The method of claim 1, further comprising:
analog processing the stored LIDAR return signal samples prior to A/D conversion to determine a time of arrival ("TOA") of a return pulse portion of the LIDAR return signal.

4. The method of claim 1, further comprising:
receiving a time of transmission ("TOT") of a LIDAR pulse transmitted through a medium; and
receiving the LIDAR return signal following the transmission of the LIDAR pulse.

5. The method of claim 4, further comprising:
digitally processing the set of digital sample values and sampling times associated with the samples of the LIDAR return signal to determine a time of arrival ("TOA") of a return pulse portion of the LIDAR return signal.

6. The method of claim 5, further comprising:
calculating a distance-to-target as a difference between the TOA and the TOT, the time difference multiplied by a speed of light through the medium divided by two.

7. The method of claim 6, further comprising:
presenting the distance-to-target and/or digital sample values at one or more output terminals.

8. The method of claim 5, further comprising:
at one or more output terminals, presenting at least one of the trigger signal, a TOA, a return pulse height, a return pulse width, or type of object from which the return pulse was reflected.

9. A light radar ("LIDAR") return signal processing apparatus, comprising:
at least one circular buffer, each circular buffer including a predetermined number of analog sampling stages, an input of each sampling stage coupled to a LIDAR return signal detector to receive a LIDAR return signal, each sampling stage to store a magnitude sample of the LIDAR return signal at a sampling time associated with the sampling stage;
a trigger circuit coupled to the LIDAR return signal detector to generate a trigger signal upon sensing a signal characteristic within the LIDAR return signal indicating a return pulse associated with a target object;
at least one capture clock phase logic module coupled to an output of the trigger circuit to generate phases of a capture control clock, each phase to control the sampling time associated with each sampling stage of a corresponding circular buffer by sequentially enabling each sampling stage during a period of time when the trigger signal is inactive ("pre-trigger period") and for a predetermined period of time after the trigger signal becomes active ("post-trigger period");
a readout clock phase logic module coupled to the output of the trigger circuit to generate phases of a readout control clock, each readout phase to control a readout of the LIDAR magnitude sample stored at each sampling stage of each circular buffer by sequentially enabling the readout of each LIDAR magnitude sample at a readout time associated with the sampling stage following the post-trigger period; and
an analog-to-digital converter ("ADC") coupled to the readout switch associated with each sampling stage of each circular buffer and synchronized with the readout control clock to digitize the LIDAR magnitude samples as they are sequentially read out to create a set of digital sample values.

10. The LIDAR return signal processing apparatus of claim 9, each sampling stage of each circular buffer further comprising:
an analog storage element to store the magnitude sample of the LIDAR return signal;
a sampling switch coupled to the analog storage element and to the LIDAR return signal detector to receive the LIDAR return signal, to initiate storage of the LIDAR return signal magnitude sample at the sampling time associated with the sampling stage when closed and to terminate the sampling time when opened; and
a readout switch coupled to the analog storage element to present the stored LIDAR return signal magnitude sample at an output of the circular buffer at a readout time associated with the sampling stage when closed.

11. The LIDAR return signal processing apparatus of claim 10, the analog storage element associated with each sampling stage being a capacitor, the magnitude sample of the LIDAR return signal stored as a voltage across the capacitor.

12. The LIDAR return signal processing apparatus of claim 9, the trigger circuit to include a voltage comparator, a first input of the voltage comparator coupled to a threshold reference voltage ("V_TH") source and a second input coupled to the LIDAR return signal detector, the voltage comparator to determine whether the LIDAR return signal is equal to or greater than V_TH.

13. The LIDAR return signal processing apparatus of claim 9, at least one of the capture clock phase logic module or the readout clock phase logic module being a delay-locked loop ("DLL"), each clock phase generated at an output of a delay line element of the DLL.

14. The LIDAR return signal processing apparatus of claim 9, further including:
a digital processor coupled to the ADC to receive the set of digital sample values and a time of transmission ("TOT") of an outgoing LIDAR pulse transmitted through a medium to the target object, to determine the time of arrival ("TOA") of the return pulse, and to calculate a distance to the target object as a time difference between the TOA and the TOT, the time difference multiplied by a speed of light through the medium divided by two.

15. A light radar ("LIDAR") return signal processing system, comprising:
a LIDAR return signal detector to receive a LIDAR return signal;
a circular buffer including a predetermined number of analog sampling stages, an input of each sampling stage coupled to the LIDAR return signal detector, each sampling stage to store a magnitude sample of the LIDAR return signal at a sampling time associated with the sampling stage;

a trigger circuit coupled to the LIDAR return signal detector to generate a trigger signal upon sensing a signal characteristic within the LIDAR return signal indicating a return pulse associated with a target object;

a capture clock phase logic module coupled to an output of the trigger circuit to generate phases of a capture control clock, each phase to control the sampling time associated with a corresponding sampling stage by sequentially enabling each sampling stage at a corresponding sampling time during a period of time when the trigger signal is inactive ("pre-trigger period") and for a predetermined period of time after the trigger signal becomes active ("post-trigger period");

a readout clock phase logic module coupled to the output of the trigger circuit to generate phases of a readout control clock, each phase to control a readout of the LIDAR magnitude sample stored at a corresponding sampling stage of the circular buffer by sequentially enabling the readout of each LIDAR magnitude sample at a readout time associated with the sampling stage following the post-trigger period;

an analog processing circuit coupled to an output of the circular buffer to perform signal processing techniques on the LIDAR magnitude samples in order to determine a time of arrival ("TOA") of the return pulse;

an analog-to-digital converter ("ADC") coupled to the analog processing circuit and synchronized with the readout control clock to digitize analog output from the analog processing circuit to create an analog processed set of digital sample values; and a digital processor coupled to the ADC to receive the analog processed set of digital sample values and a time of transmission ("TOT") of an outgoing LIDAR pulse transmitted through a medium to the target object, to determine the TOA of the return pulse, and to calculate a distance to the target object as a time difference between the TOA and the TOT, the time difference multiplied by a speed of light through the medium divided by two.

16. The LIDAR return signal processing system of claim 15, each sampling stage further comprising:
   an analog storage element to store the magnitude sample of the LIDAR return signal;
   a sampling switch coupled to the analog storage element and to the LIDAR return signal detector to receive the LIDAR return signal, to initiate storage of the LIDAR return signal magnitude sample at the sampling time associated with the sampling stage when closed and to terminate the sampling time when opened; and
   a readout switch coupled to the analog storage element to present the stored LIDAR return signal magnitude sample at an output of the circular buffer at a readout time associated with the sampling stage when closed.

17. The LIDAR return signal processing system of claim 16, the analog storage element associated with each sampling stage being a capacitor, the magnitude sample of the LIDAR return signal stored as a voltage across the capacitor.

18. The LIDAR return signal processing system of claim 15, the trigger circuit being a voltage comparator, a first input of the voltage comparator coupled to a threshold reference voltage ("V_TH") source and a second input coupled to the LIDAR return signal detector, the voltage comparator to determine whether the LIDAR return signal is equal to or greater than V_TH.

19. The LIDAR return signal processing system of claim 15, the LIDAR return signal detector further comprising:
   a photo detector; and
   a low noise amplifier.

20. The LIDAR return signal processing system of claim 15, the analog processing circuit to include a center of gravity weighted averaging circuit.

* * * * *